US007858869B2

(12) United States Patent
Goto et al.

(10) Patent No.: US 7,858,869 B2
(45) **Date of Patent: *Dec. 28, 2010**

(54) SOUND ANALYSIS APPARATUS AND PROGRAM

(75) Inventors: Masataka Goto, Tsukuba (JP); Takuya Fujishima, Hamamatsu (JP); Keita Arimoto, Hamamatsu (JP)

(73) Assignees: National Institute of Advanced Industrial Science and Technology, Tokyo (JP); Yamaha Corporation, Hamamatsu-shi (JP)

( * ) Notice: Subject to any disclaimer, the term of this patent is extended or adjusted under 35 U.S.C. 154(b) by 341 days.

This patent is subject to a terminal disclaimer.

(21) Appl. No.: 12/037,036

(22) Filed: Feb. 25, 2008

(65) Prior Publication Data

US 2008/0202321 A1 Aug. 28, 2008

(30) Foreign Application Priority Data

Feb. 26, 2007 (JP) ............................ 2007-045193

(51) Int. Cl.
*G10H 1/18* (2006.01)
*G06F 17/00* (2006.01)

(52) U.S. Cl. .......................................... 84/616; 700/94

(58) Field of Classification Search .................. 84/616, 84/654, 681; 700/94
See application file for complete search history.

(56) References Cited

U.S. PATENT DOCUMENTS

2004/0044487 A1 3/2004 Jung
2006/0011046 A1 1/2006 Miyaki et al.
2008/0053295 A1* 3/2008 Goto et al. .................... 84/616
2008/0312913 A1 12/2008 Goto

FOREIGN PATENT DOCUMENTS

| | | | |
|---|---|---|---|
| JP | 2001-125562 | | 5/2001 |
| JP | 2004-515808 | | 5/2004 |
| JP | 2004-341026 | | 12/2004 |
| WO | WO 2006/079813 | A1 | 8/2006 |
| WO | WO 2006/106946 | A1 | 10/2006 |

OTHER PUBLICATIONS

Goto, Masataka, "A Real-time Music Scene Description System: System Overview and Extension of F0 Estimation Method", Information Processing Society of Japan, Special Interest Group on Music and Computer, Study report 2000-MUS-37-2, vol. 2000, No. 94, pp. 9-16, Oct. 16, 2000 (eight pages).

(Continued)

*Primary Examiner*—Elvin G Enad
*Assistant Examiner*—Andrew R Millikin
(74) *Attorney, Agent, or Firm*—Morrison & Foerster LLP

(57) ABSTRACT

A sound analysis apparatus employs tone models which are associated with various fundamental frequencies and each of which simulates a harmonic structure of a performance sound generated by a musical instrument, then defines a weighted mixture of the tone models to simulate frequency components of the performance sound, further sequentially updates and optimizes weight values of the respective tone models so that a frequency distribution of the weighted mixture of the tone models corresponds to a distribution of the frequency components of the performance sound, and estimates the fundamental frequency of the performance sound based on the optimized weight values.

4 Claims, 6 Drawing Sheets

OTHER PUBLICATIONS

Japanese Office Action mailed Feb. 3, 2009 for JP Application No. 2007-045193.
European Search Report mailed Sep. 29, 2009, for EP Application No. 08101972.1, six pages.
Goto, M. (Jun. 5, 2000). "A Robust Predominant-FO Estimation Method for Real-Time Detection of Melody and Bass Lines in CD Recordings," *Proceedings 2000 IEEE International Conference* , Jun. 5-9, 2000, Piscataway, NJ, IEEE 2:757-760.

* cited by examiner

SOUND ANALYSIS APPARATUS AND PROGRAM

BACKGROUND OF THE INVENTION

1. Technical Field

The present invention relates to a sound analysis apparatus and a sound analysis program that determine whether a performance sound is generated at a pitch as designated by a musical note or the like.

2. Background Art

Various types of musical instruments having a performance self-teaching function have been provided in the past. Keyboard instruments are taken for instance. This type of musical instrument having the self-teaching function guides a user (player) to a key to be depressed by means of display or the like on a display device, senses a key depressed by the user, informs the user of whether a correct key has been depressed, and prompts the user to teach himself/herself a keyboard performance. For realization of the self-teaching function, a key depressed by a user has to be sensed. This poses a problem in that a keyboard instrument without a key scan mechanism cannot be provided with the self-teaching function.

Consequently, a proposal has been made of a technology for collecting a performance sound, analyzing the frequency of the sound, and deciding whether a performance sound having a correct pitch designated by a musical note has been generated. For example, according to a technology disclosed in a patent document 1, various piano sounds of different pitches are collected, the frequencies of the collected sounds are analyzed, and a power spectrum of a piano sound of each pitch is obtained and stored in advance. When a piano performance is given, a performance sound is collected, and the frequency of the sound is analyzed in order to obtain a power spectrum. Similarities of the power spectrum of the performance sound to the power spectra of various piano sounds of different pitches that are stored in advance are obtained. Based on the degrees of similarities, a decision is made on whether the performance has been conducted as prescribed by the musical notes.

[Patent Document 1] JP-A-2004-341026

[Patent Document 2] Japanese Patent No. 3413634

[Non-patent Document 1] "Real-time Musical Scene Description System: overall idea and expansion of a pitch estimation technique" (by Masataka Goto, Information Processing Society of Japan, Special Interest Group on Music and Computer, Study report 2000-MUS-37-2, Vol. 2000, No. 94, pp. 9-16, Oct. 16, 2000)

However, the power spectrum of an instrumental sound has overtone components at many frequency positions. The ratio of each overtone component is diverse. When there are two instrumental sounds to be compared with each other, although their fundamental frequencies are different from each other, the shapes of their power spectra may resemble. Consequently, according to the technology in the patent document 1, when a performance sound of a certain fundamental frequency is collected, a piano sound whose fundamental frequency is different from the fundamental frequency of the collected performance sound but whose power spectrum resembles in shape with the power spectrum of the collected performance sound might be inadvertently selected. This poses a problem in that the pitch of the collected performance sound may be incorrectly decided. Moreover, according to the technology in the patent document 1, since the fundamental frequency of a collected performance sound is not obtained, an error in a musical performance cannot be pointed out in such a manner that a sound which should have a certain pitch is played at another pitch.

SUMMARY OF THE INVENTION

The present invention addresses the foregoing situation. An object of the present invention is to provide a sound analysis apparatus capable of accurately deciding a fundamental frequency of a performance sound.

The present invention provides a sound analysis apparatus comprising: a performance sound acquisition part that externally acquires a performance sound of a musical instrument; a target fundamental frequency acquisition part that acquires a target fundamental frequency to which a fundamental frequency of the performance sound acquired by the performance sound acquisition part should correspond; a fundamental frequency estimation part that employs tone models which are associated with various fundamental frequencies and each of which simulates a harmonic structure of a performance sound generated by a musical instrument, then defines a weighted mixture of the tone models to simulate frequency components of the performance sound, then sequentially updates and optimizes weight values of the respective tone models so that a frequency distribution of the weighted mixture of the tone models corresponds to a distribution of the frequency components of the performance sound acquired by the performance sound acquisition part, and estimates the fundamental frequency of the performance sound acquired by the performance sound acquisition part based on the optimized weight values; and a decision part that makes a decision on a fundamental frequency of the performance sound, which is acquired by the performance sound acquisition part, on the basis of the target fundamental frequency acquired by the target fundamental frequency acquisition part and the estimated fundamental frequency of the performance sound.

According to the present invention, tone models each of which simulates a harmonic structure of a sound generated by a musical instrument are employed. Weight values for the respective tone models are sequentially updated and optimized so that the frequency components of the performance sound acquired by the performance sound acquisition part are presented by a mixed distribution obtained by weighting and adding up the tone models associated with various fundamental frequencies. The fundamental frequency of the performance sound acquired by the performance sound acquisition part is then estimated. Consequently, the fundamental frequency of the performance sound can be highly precisely estimated, and a decision can be accurately made on the fundamental frequency of the performance sound.

DETAILED DESCRIPTION OF THE INVENTION

Referring to drawings, embodiments of the present invention will be described below.

<Overall Configuration>

Figure 1:
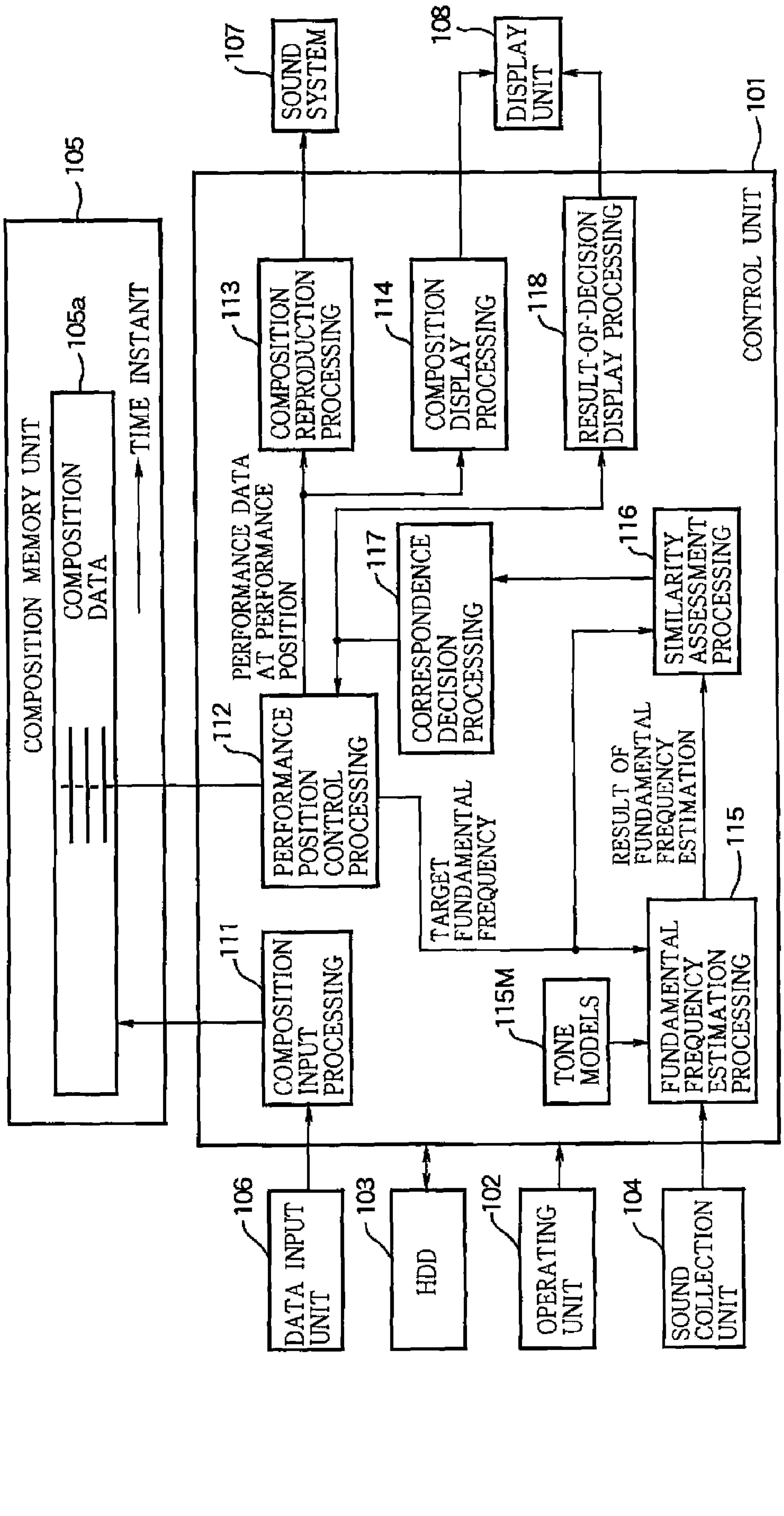
FIG. 1 is a block diagram showing the configuration of a teaching accompaniment system that includes an embodiment of a sound analysis apparatus in accordance with the present invention.

FIG. 1 is a block diagram showing the configuration of a teaching accompaniment system that contains an embodiment of a sound analysis apparatus in accordance with the present invention. The teaching accompaniment system is a system that operates in a musical instrument, for example, a keyboard instrument, and that allows a user to teach himself/herself an instrumental performance. In FIG. 1, a control unit 101 includes a CPU that runs various programs, and a RAM or the like to be used as a work area by the CPU. In FIG. 1, shown in a box expressing the control unit 101 are the contents of pieces of processing to be performed by a program, which realizes a facility that serves as the teaching accompaniment system in accordance with the present embodiment, among programs to be run by the CPU in the control unit 101. An operating unit 102 is a device that receives various commands or information from a user, and includes operating pieces such as panel switches arranged on a main body of a musical instrument. A hard disk drive (HDD) 103 is a storage device in which various programs and databases are stored. The program for realizing the facility that serves as the teaching accompaniment system in accordance with the present embodiment is also stored in the HDD 103. When a command for activating the facility serving as the teaching accompaniment system is given by manipulating the operating unit 102, the CPU of the control unit 101 loads the program, which realizes the facility serving as the teaching accompaniment system, into the RAM, and runs the program.

A sound collection unit 104 includes a microphone that collects a sound of an external source and outputs an analog acoustic signal, and an analog-to-digital (A/D) converter that converts the analog audio signal into a digital acoustic signal. In the present embodiment, the sound collection unit 104 is used as a performance sound acquisition part for externally acquiring a performance sound.

A composition memory unit 105 is a memory device in which composition data is stored, and formed with, for example, a RAM. Herein, what is referred to as composition data is a set of performance data items associated with various parts that include a melody part and a bass part and that constitute a composition. Performance data associated with one part is time-sequential data including event data that signifies generation of a performance sound, and timing data that signifies the timing of generating the performance sound. A data input unit 106 is a part for externally fetching composition data of any of various compositions. For example, a device that reads composition data from a storage medium such as an FD or an IC memory or a communication device that downloads composition data from a server over a network is adopted as the data input unit 106.

A sound system 107 includes a digital-to-analog (D/A) converter that converts a digital acoustic signal into an analog acoustic signal, and a loudspeaker or the like that outputs the analog acoustic signal as a sound. A display unit 108 is, for example, a liquid crystal panel display. In the present embodiment, the display unit 108 is used as a part for displaying a composition to be played, displaying an image of a keyboard so as to inform a user of a key to be depressed, or displaying a result of a decision made on whether a performance given by a user has been appropriate. Incidentally, the result of a decision is not limited to the display but may be presented to the user in the form of an alarm sound, vibrations, or the like.

Next, a description will be made of the contents of processing to be performed by a program that realizes a facility serving as the teaching accompaniment system in accordance with the present embodiment. To begin with, composition input processing 111 is a process in which the data input unit 106 acquires composition data 105*a* in response to a command given via the operating unit 102, and stores the composition data in the composition memory unit 105. Performance position control processing 112 is a process in which: a position to be played by a user is controlled; performance data associated with the performance position is sampled from the composition data 105*a* in the composition memory unit 105, and outputted; and a target fundamental frequency that is a fundamental frequency of a sound the user should play is detected based on the sampled performance data, and outputted. Control of the performance position in the performance position control processing 112 is available in two modes. The first mode is a mode in which: a user plays a certain part on a musical instrument; when a certain performance sound is generated by playing the musical instrument, if the performance sound is a performance sound having a correct pitch specified in performance data of the part in the composition data, the performance position is advanced to the position of a performance sound succeeding the performance sound. The second mode is a mode of an automatic performance, that is, a mode in which: event data items are sequentially read at timings specified in timing data associated with each part; and the performance position is advanced interlocked with the reading. In whichever of the modes the performance position is controlled through the performance position control processing 112 is determined with a command given via the operating unit 102. Whichever of parts specified in the composition data 105*a* a user should play is determined with a command given via the operating unit 102.

Composition reproduction processing 113 is a process in which: performance data of a part other than a performance part to be played by a user is selected from among performance data items associated with a performance position outputted through the performance position control processing 112; and sample data of a waveform representing a performance sound (that is, a background sound) specified in the performance data is produced and fed to the sound system 107. Composition display processing 114 is a process in which pieces of information representing a performance position to be played by a user and a performance sound are displayed on the display unit 108. The composition display processing 114 is available in various modes. In a certain mode, the composition display processing 114 is such that: a musical note of a composition to be played is displayed on the display unit 108 according to the composition data 105*a*; and a mark indicating a performance position to be played by a user is displayed in the musical note on the basis of performance data associated with the performance position. In the composition display processing 114 in another mode, for example, an image of a keyboard is displayed on the display unit 108, and a key to be depressed by a user is displayed based on performance data associated with a performance position.

Fundamental frequency estimation processing 115 is a process in which: tone models 115M each simulating a harmonic structure of a sound generated by a musical instrument are employed; weight values for the respective tone models 115M are optimized so that the frequency components of a performance sound collected by the sound collection unit 104 will manifest a mixed distribution obtained by weighting and adding up the tone models 115M associated with various fundamental frequencies; and the fundamental frequency of the performance sound collected by the sound collection unit 104 is estimated based on the optimized weight values for the respective tone models 115M. In the fundamental frequency estimation processing 115 in the present embodiment, a target fundamental frequency outputted from the performance position control processing 112 is used as a preliminary knowledge to estimate the fundamental frequency. Similarity assessment processing 116 is a process of calculating a similarity between the fundamental frequency estimated through the fundamental frequency estimation processing 115 and the target fundamental frequency obtained through the performance position control processing 112. Correspondence decision processing 117 is a process of deciding based on the similarity obtained through the similarity assessment processing 116 whether the fundamental frequency estimated through the fundamental frequency estimation processing 115 and the target fundamental frequency obtained through the performance position control processing 112 correspond with each other. The result of a decision made through the correspondence decision processing 117 is passed to each of result-of-decision display processing 118 and the foregoing performance position control processing 112. In the performance position control processing 112, when the aforesaid first mode is selected by manipulating the operating unit 102, only if the result of a decision made by the correspondence decision processing 117 is affirmative, control is performed to advance the performance position to the position of the next performance sound. The result-of-decision display processing 118 is a process of displaying on the display unit 108 the result of a decision made by the correspondence decision processing 117, that is, whether a user has generated a performance sound at a pitch specified in performance data.

<Contents of the Fundamental Frequency Estimation Processing 115>

Next, the contents of the fundamental frequency estimation processing 115 in the present embodiment will be described below. The fundamental frequency estimation processing 115 is based on a technology disclosed in the patent document 2, and completed by applying an improvement disclosed in the non-patent document 1 to the technology.

According to the technology of the patent document 2, a frequency component belonging to a frequency band thought to represent a melody sound and a frequency component belonging to a frequency band thought to represent a bass sound are mutually independently fetched from an input acoustic signal using a BPF. Based on the frequency component of each of the frequency bands, the fundamental frequency of each of the melody sound and bass sound is estimated.

To be more specific, according to the technology of the patent document 2, tone models each of which manifests a probability distribution equivalent to a harmonic structure of a sound are prepared. Each frequency component in a frequency band representing a melody sound or each frequency component in a frequency band representing a bass sound is thought to manifest a mixed distribution of tone models that are associated with various fundamental frequencies and are weighted and added up. Weight values for the respective tone models are estimated using an expectation maximization (EM) algorithm.

The EM algorithm is an iterative algorithm for performing maximum likelihood estimation on a probability model including a hidden variable, and can provide a local optimal solution. Since a probability distribution including the largest weight value can be regarded as a harmonic structure that is most dominant at that time instant, the fundamental frequency in the dominant harmonic structure is recognized as a pitch. Since this technique does not depend on the presence of a fundamental frequency component, it can appropriately deal with a missing fundamental phenomenon. The most dominant harmonic structure can be obtained without dependence on the presence of the fundamental frequency component.

The non-patent document 1 has performed expansions described below on the technology of the patent document 2.

<Expansion 1: Multiplexing Tone Models>

According to the technology of the patent document 2, only one tone model is prepared for the same fundamental frequency. In reality, sounds having different harmonic structures may alternately appear at a certain fundamental frequency. Therefore, multiple tone models are prepared for the same fundamental frequency, and an input acoustic signal is modeled as a mixed distribution of the tone models.

<Expansion 2: Estimating a Parameter of a Tone Model>

According to the technology of the patent document 2, the ratio of magnitudes of harmonic components in a tone model is fixed (an ideal tone model is tentatively determined). This does not always correspond with a harmonic structure of a mixed sound in a real world. For improvement in precision, there is room for sophistication. Consequently, the ratio of harmonic components in a tone model is added as a model parameter, and estimated at each time instant using the EM algorithm.

<Expansion 3: Introducing a Preliminary Distribution Concerning a Model Parameter>

According to the technology of the patent document 2, a preliminary knowledge on a weight for a tone model (probability density function of a fundamental frequency) is not tentatively determined. However, depending on the usage of the fundamental frequency estimation technology, there is a demand for obtaining a fundamental frequency without causing erroneous detection as much as possible even by preliminarily providing to what frequency a fundamental frequency is close. For example, for the purpose of performance analysis or vibrato analysis, a fundamental frequency at each time instant is prepared as a preliminary knowledge by singing a song or playing a musical instrument while hearing a composition through headphones. A more accurate fundamental frequency is requested to be actually detected in the composition. Consequently, a scheme of maximum likelihood estimation for a model parameter (a weight value for a tone model) in the patent document 2 is expanded, and maximum a posteriori probability estimation (MAP estimation) is performed based on the preliminary distribution concerning the model parameter. At this time, a preliminary distribution concerning the ratio of magnitudes of harmonic components of a tone model that is added as a model parameter in <expansion 2> is also introduced.

Figure 2:
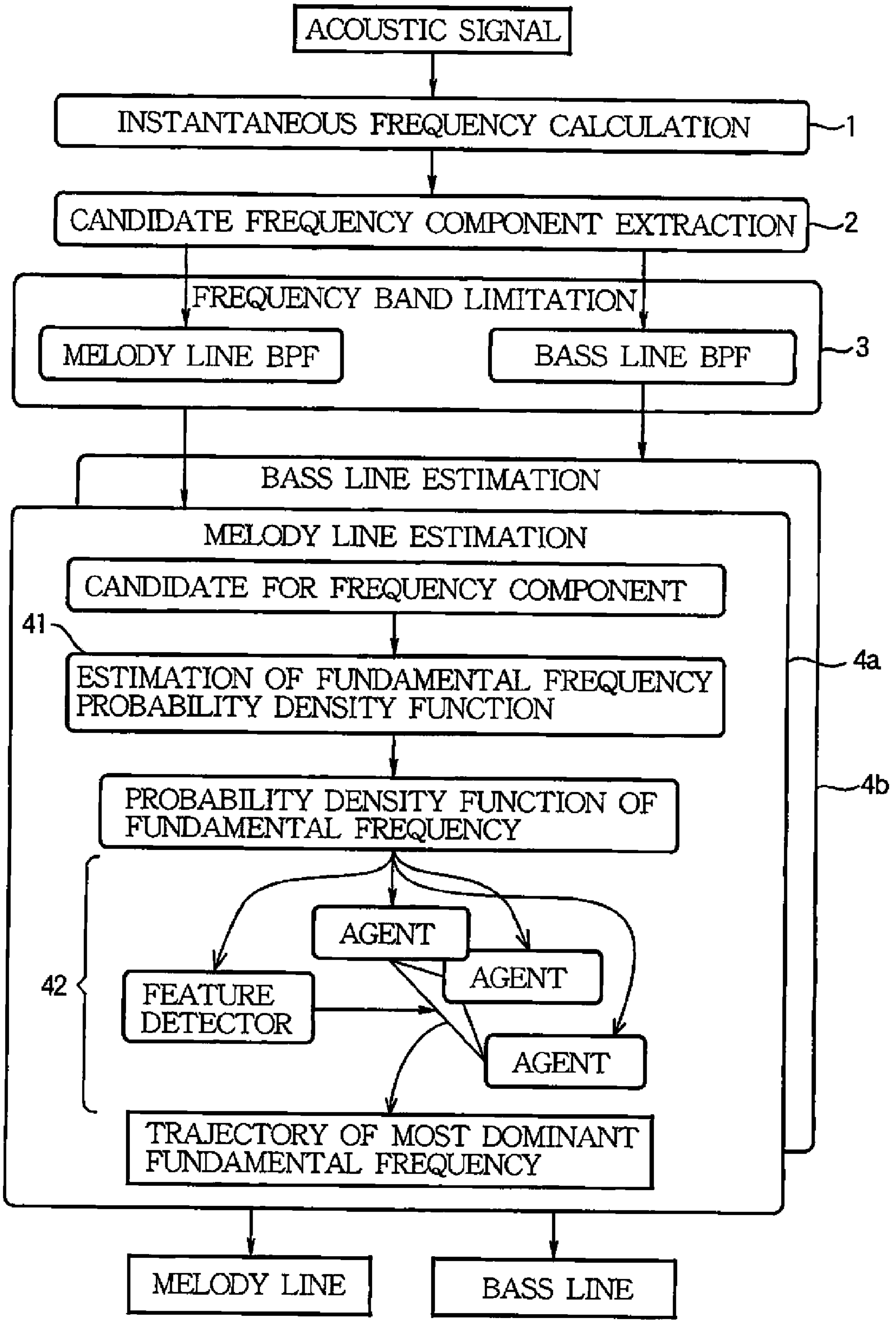
FIG. 2 shows the contents of fundamental frequency estimation processing executed in the present embodiment.

FIG. 2 shows the contents of the fundamental frequency estimation processing 115 in the present embodiment configured by combining the technology of the patent document 2 with the technology of the non-patent document 1. In the fundamental frequency estimation processing 115, a melody line and a bass line are estimated. A melody is a series of single notes heard more distinctly than others, and a bass is a series of the lowest single notes in an ensemble. A trajectory of a temporal change in the melody and a trajectory of a temporal change in the bass are referred to as the melody line Dm(t) and bass line Db(t) respectively. Assuming that Fi(t)

(i=m, b) denotes a fundamental frequency F0 at a time instant t and Ai (t) denotes an amplitude, the melody line and bass line are expressed as follows:

$$Dm(t)=\{Fm(t), Am(t)\} \quad (1)$$

$$Db(t)=\{Fb(t), Ab(t)\} \quad (2)$$

As a part for acquiring the melody line Dm(t) and bass line Db(t) from an input acoustic signal representing a performance sound collected by the sound collection unit 104, the fundamental frequency estimation processing 115 includes instantaneous frequency calculation 1, candidate frequency component extraction 2, frequency band limitation 3, melody line estimation 4*a*, and bass line estimation 4*b*. Moreover, the pieces of processing of the melody line estimation 4*a* and bass line estimation 4*b* each include fundamental frequency probability density function estimation 41 and multi-agent model-based fundamental frequency time-sequential tracking 42. In the present embodiment, when a user's performance part is a melody part, the melody line estimation 4*a* is executed. When the user's performance part is a bass part, the bass line estimation 4*b* is executed.

<<Instantaneous Frequency Calculation 1>>

In this processing, an input acoustic signal is fed to a filter bank including multiple BPFs, and an instantaneous frequency that is a time derivative of a phase is calculated for each of output signals of the BPFs of the filter bank (refer to "Phase Vocoder" (by Flanagan, J. L. and Golden, R. M. "Phase Vocoder", The BellSystem Technical J., Vol. 45, pp. 1493-1509, 1966). Herein, the Flanagan technique is used to interpret an output of short-time Fourier transform (STFT) as a filter bank output so as to efficiently calculate the instantaneous frequency. Assuming that the STFT of an input acoustic signal x(t) using a window function h(t) is provided by equations (3) and (4), the instantaneous frequency λ(ω,t) can be calculated using an equation (5) below.

$$X(\omega, t) = \int_{-\infty}^{+\infty} x(\tau)h(t-\tau)e^{-j\omega\tau}d\tau \quad (3)$$

$$= a + jb \quad (4)$$

$$\lambda(\omega, t) = \omega + \frac{a\frac{\partial b}{\partial t} - b\frac{\partial a}{\partial t}}{a^2 + b^2} \quad (5)$$

Herein, h(t) denotes a window function that achieves localization of a time frequency (for example, a time window created by convoluting a second-order cardinal B-spline function to a Gauss function that achieves optimal localization of a time frequency).

For calculation of the instantaneous frequency, wavelet transform may be adopted. Herein, STFT is used to decrease an amount of computation. When one kind of STFT alone is adopted, a time resolution or a frequency resolution for a certain frequency band is degraded. Therefore, a multi-rate filter bank is constructed (refer to "A Theory of Multirate Filter Banks" (by Vetterli, M., IEEE Trans. on ASSP, Vol. ASSP-35, No. 3, pp. 356-372, 1987) in order to attain a somewhat reasonable time-frequency resolution under the restriction that it can be executed in real time.

<<Candidate Frequency Component Extraction 2>>

In this processing, a candidate for a frequency component is extracted based on mapping from a center frequency of a filter to an instantaneous frequency (refer to "Pitch detection using the short-term phase spectrum" (by Charpentier, F. J., Proc. of ICASSP 86, pp. 113-116, 1986). Mapping from the center frequency ω of a certain STFT filter to the instantaneous frequency λ(ω,t) of the output thereof will be discussed. If a frequency component of a frequency ϕ is found, ϕ is positioned at a fixed point of the mapping and the value of the neighboring instantaneous frequency is nearly constant. Namely, the instantaneous frequency $\Psi_f^{(t)}$ of every frequency component can be extracted using the equation below.

$$\Psi_f^{(t)} = \left\{\Psi \mid \lambda(\phi, t) - \phi = 0, \frac{\partial}{\partial\phi}(\lambda(\phi, t) - \phi) < 0\right\} \quad (6)$$

Since the power of a frequency component can be obtained as a value of an STFT power spectrum with respect to each frequency $\Psi_f^{(t)}$, a power distribution function $\Psi_p^{(t)}(\omega)$ for the frequency component can be defined by the equation below.

$$\Psi_p^{(t)}(\omega) = \begin{cases} |X(\omega, t)| & \text{if } \omega \in \Psi_f^{(t)} \\ 0 & \text{otherwise} \end{cases} \quad (7)$$

<<Frequency Band Limitation 3>>

In this processing, an extracted frequency component is weighted in order to limit a frequency band. Herein, two kinds of BPFs are prepared for a melody line and a base line respectively. The melody line BPF can pass a major fundamental frequency component of a typical melody line and many harmonic components thereof, and blocks a frequency band, in which a frequency overlap frequently takes place, to some extent. On the other hand, the bass line BPF can pass a major fundamental frequency component of a typical bass line and many harmonic components thereof, and blocks a frequency band, in which any other performance part dominates over the bass line, to some extent.

In the present embodiment, a frequency on a logarithmic scale is expressed in the unit of cent (which originally is a measure expressing a difference between pitches (a musical interval)), and a frequency fHz expressed in the unit of Hz is converted into a frequency fcent expressed in the unit of cent according to the equation below.

$$f_{cent} = 1200\log_2\frac{f_{Hz}}{REF_{Hz}} \quad (8)$$

$$REF_{Hz} = 440 \times 2^{\frac{3}{12}-5} \quad (9)$$

A semitone in the equal temperament is equivalent to 100 cent, and one octave is equivalent to 1200 cent.

Assuming that BPFi(x) (i=m, b) denotes the frequency response of a BPF at a frequency x cent and $\Psi'^{(t)}_p(x)$ denotes a power distribution function of a frequency component, a frequency component having passed through the BPF can be expressed as $BPFi(x)\Psi'^{(t)}_p(x)$. Herein, $\Psi'^{(t)}_p(x)$ denotes the same function as $\Psi_p^{(t)}(\omega)$ except that a frequency axis is expressed in cent. As a preparation for the next step, a probability density function $p_\Psi^{(t)}(x)$ of a frequency component having passed through the BPF will be defined below.

$$p_\Psi^{(t)}(x) = \frac{BPFi(x)\Psi'^{(t)}_p(x)}{Pow^{(t)}} \quad (10)$$

Herein, $Pow^{(t)}$ denotes a sum total of powers of frequency components having passed through the BPF and is expressed by the equation below.

$$Pow^{(t)}=\int_{-\infty}^{+\infty} BPFI(x)\Psi'_p{}^{(t)}(x)dx \quad (11)$$

<<Fundamental Frequency Probability Density Function Estimation 41>>

In the fundamental frequency probability density function estimation 41, a probability density function of a fundamental frequency signifying to what extent each harmonic structure is dominant relatively to a candidate for a frequency component having passed through a BPF is obtained. The contents of the fundamental frequency probability density function estimation 41 are those having undergone an improvement disclosed in the non-patent document 1.

In the fundamental frequency probability density function estimation 41, for realization of the aforesaid expansion 1 and expansion 2, tone models of Mi types (where i indicates whether it is concerned with a melody (i=m) or a bass (i=b)) are defined for the same fundamental frequency. Assuming that F denotes a fundamental frequency and the type of tone model is the m-th type, the tone model $p(x|F,m,\mu^{(t)}(F,m))$ having a model parameter $\mu^{(t)}(F,m)$ shall be defined by the equation below.

$$p(x\,|\,F, m, \mu^{(t)}(F, m)) = \sum_{h=1}^{Hi} p(x, h\,|\,F, m, \mu^{(t)}(F, m)) \quad (12)$$

$$p(x, h\,|\,F, m, \mu^{(t)}(F, m)) = c^{(t)}(h\,|\,F, m)G(x; F + 1200\log_2 h, Wi) \quad (13)$$

$$\mu^{(t)}(F, m) = \{c^{(t)}(h\,|\,F, m)\,|\,h = 1 \sim Hi\} \quad (14)$$

$$G(x; x0, \sigma) = \frac{1}{\sqrt{2\pi\sigma^2}}e^{-\frac{(x-x0)^2}{2\sigma^2}} \quad (15)$$

This tone model signifies at what frequencies harmonic components appear relative to a fundamental frequency F. Hi denotes the number of harmonic components including a fundamental frequency component, and $W_i^2$ denotes a variance of a Gaussian distribution $G(x;x0,\sigma)$. $c^{(t)}(h|F,m)$ expresses the magnitude of a h-th-order harmonic component of an m-th tone model associated with the fundamental frequency F, and satisfies the equation below.

$$\sum_{h=1}^{Hi} c^{(t)}(h\,|\,F, m) = 1 \quad (16)$$

As expressed by the equation (16), a weight $c^{(t)}(h|F,m)$ for the tone model associated with the fundamental frequency F is a weight pre-defined so that a sum total will be 1.

In the fundamental frequency probability density function estimation 41, the above tone model is used, and a probability density function $p_\Psi^{(t)}(x)$ of a fundamental frequency is considered to be produced from a mixed distribution model $p(x|\theta^{(t)})$ of $p(x|F,m,\mu^{(t)}(F,m))$ defined by the equation below.

$$p(x\,|\,\theta^{(t)}) = \int_{Fli}^{Fhi}\sum_{m=1}^{Mi} w^{(t)}(F, m)p(x\,|\,F, m, \mu^{(t)}(F, m))dF \quad (17)$$

$$\theta^{(t)} = \{w^{(t)}, \mu^{(t)}\} \quad (18)$$

-continued $$w^{(t)} = \{w^{(t)}(F, m)\,|\,Fli \le F \le Fhi, m = 1, \ldots , Mi\} \quad (19)$$

$$\mu^{(t)} = \{\mu^{(t)}(F, m)\,|\,Fli \le F \le Fhi, m = 1, \ldots , Mi\} \quad (20)$$

Herein, Fhi and Fli denote the upper limit and lower limit of permissible fundamental frequencies, and $w^{(t)}(F,m)$ denotes a weight for a tone mode that satisfies the equation below.

$$\int_{Fli}^{Fhi}\sum_{m=1}^{Mi} w^{(t)}(F, m)dF = 1 \quad (21)$$

It is impossible to tentatively determine the number of sound sources in advance with respect to a mixed sound in a real world. It is therefore important to produce a model in consideration of the possibility of every fundamental frequency as given by the equation (17). Finally, if a model parameter $\theta^{(t)}$ can be estimated from the model $p(x|\theta^{(t)})$ so that an observed probability density function $p_\Psi^{(t)}(x)$ is produced therefrom, since a weight $w^{(t)}(F,m)$ signifies to what extent each harmonic striction is dominant, the weight can be interpreted as a probability density function $p_{F0}^{(t)}(F)$ as expressed by the equation below.

$$p_{F0}^{(t)}(F) = \sum_{m=1}^{Mi} w^{(t)}(F, m)(Fli \le F \le Fhi) \quad (22)$$

In order to realize the aforesaid expansion 3, a preliminary distribution $po_i(\theta^{(t)})$ of $\theta^{(t)}$ is provided as a product of the equations (24) and (25) as expressed by the equation (23) below.

$$p_{0i}(\theta^{(t)}) = p_{0i}(w^{(t)})p_{0i}(\mu^{(t)}) \quad (23)$$

$$p_{0i}(w^{(t)}) = \frac{1}{Zw}e^{-\beta_{\mu i}^{(t)}D_w(w_{0i}^{(t)};w^{(t)})} \quad (24)$$

$$p_{0i}(\mu^{(t)}) = \frac{1}{Z_\mu}e^{-\int_{Fli}^{Fhi}\sum_{m=1}^{Mi}\beta_{\mu i}^{(t)}(F,m)D_\mu(\mu_{0i}^{(t)}(F,m);\mu^{(t)}(F,m))dF} \quad (25)$$

Now, assuming that $wo_i^{(t)}(F,m)$ and $\mu o_i^{(t)}(F,m)$ denote parameters that are most likely to occur, $po_i(w^{(t)})$ and $po_i(\mu^{(t)})$ denote unimodal preliminary distributions that assume maximum values with respect to the parameters. Herein, $Z_w$ and $Z_\mu$ denote normalization coefficients, and $\beta_{wi}^{(t)}$ and $\beta_{\mu i}^{(t)}(F,m)$ denote parameters that determine to what extent the maximum values are emphasized in the preliminary distributions. When the parameters are 0s, the preliminary distributions are non-information preliminary distributions (uniform distributions). Moreover, $D_w(wo_i^{(t)};w^{(t)})$ and $D_\mu(\mu o_i^{(t)}(F,m);\mu^{(t)}(F,m))$ denote pieces of Kullback-Leibler's (K-L) information as expressed below.

$$D_w(W_{0i}^{(t)}; w^{(t)}) = \int_{Fli}^{Fhi}\sum_{m=1}^{Mi} w_{0i}^{(t)}(F, m)\log\frac{w_{0i}^{(t)}(F, m)}{w^{(t)}(F, m)}dF \quad (26)$$

-continued $$D_\mu(\mu_{0i}^{(t)}(F,m);\mu^{(t)}(F,m))=\sum_{h=1}^{Hi}c_{0i}^{(t)}(h\mid F,m)\log\frac{c_{0i}^{(t)}(h\mid F,m)}{c^{(t)}(h\mid F,m)} \quad (27)$$

From the above description, it is understood that when a probability density function $p_\Psi^{(t)}(x)$ is observed, a problem of estimating a parameter $\theta^{(t)}$ of a model $p(x|\theta^{(t)})$ on the basis of a preliminary distribution $po_i(\theta^{(t)})$ should be solved. A maximum a posteriori probability (MAP) estimate of $\theta^{(t)}$ based on the preliminary distribution is obtained by maximizing the equation below.

$$\int_{-\infty}^{+\infty}p_\Psi^{(t)}(x)(\log p(x|\theta^{(t)})+\log p_{0i}(\theta^{(t)}))dx \quad (28)$$

Since it is hard to analytically solve the maximization problem, the aforesaid expectation maximization (EM) algorithm is used to estimate $\theta^{(t)}$. The EM algorithm is an iterative algorithm that alternately applies an expectation (E) step and a maximization (M) step so as to perform maximum likelihood estimation using incomplete observation data (in this case, the $p_\Psi^{(t)}(x)$). In the present embodiment, the EM algorithm is repeated in order to obtain the most likely weight parameter $\theta^{(t)}(=\{w^{(t)}(F,m), \mu^{(t)}(F,m)\})$ on the assumption that the probability density function $p_\Psi^{(t)}(x)$ of a frequency component having passed through a BPF is considered as a mixed distribution obtained by weighting and adding up multiple tone models $p(x|F,m,\mu^{(t)}(F,m))$ associated with various fundamental frequencies F. Herein, every time the EM algorithm is repeated, an old parameter estimate $\theta_{old}^{(t)}(=\{w_{old}^{(t)}(F,m), \mu_{old}^{(t)}(F,m)\})$ of the parameter $\theta^{(t)}(=\{w^{(t)}(F,m), \mu^{(t)}(F,m)\})$ is updated in order to obtain a new (more likely) parameter estimate $\theta_{new}^{(t)}$ $(=\{w_{new}^{(t)}(F,m), \mu_{new}^{(t)}(F,m)\})$. As the initial value of $\theta_{old}^{(t)}$, the last estimate obtained at an immediately preceding time instant t-1 is used. A recurrence equation for obtaining the new parameter estimate $\theta_{new}^{(t)}$ from the old parameter estimate $\theta_{old}^{(t)}$ is presented below. For a process of deducing the recurrence equation, refer to the non-patent document 1.

$$w_{new}^{(t)}(F,m)=\frac{w_{ML}^{(t)}(F,m)+\beta_{wi}^{(t)}w_{0i}^{(t)}(F,m)}{1+\beta_{wi}^{(t)}} \quad (29)$$

$$c_{new}^{(t)}(h\mid F,m)=\frac{w_{ML}^{(t)}(F,m)c_{ML}^{(t)}(h\mid F,m)+\beta_{\mu i}^{(t)}(F,m)c_{0i}^{(t)}(h\mid F,m)}{w_{ML}^{(t)}(F,m)+\beta_{\mu i}^{(t)}(F,m)} \quad (30)$$

In the above equations (29) and (30), $w_{ML}^{(t)}(F,m)$ to $c_{ML}^{(t)}(h|F,m)$ are estimates obtained when a non-information preliminary distribution is defined with $\beta_{wi}^{(t)}=0$ and $\beta_{\mu i}^{(t)}(F,m)=0$, that is, are obtained through maximum likelihood estimation, and provided by the equations below.

$$w_{ML}^{(t)}(F,m)=\int_{-\infty}^{+\infty}p_\Psi^{(t)}(x)\frac{w_{old}^{(t)}(F,m)p(x\mid F,m,\mu_{old}^{(t)}(F,m))}{\int_{Fli}^{Fhi}\sum_{\nu=1}^{Mi}w_{old}^{(t)}(\eta,\nu)p(x\mid\eta,\nu,\mu_{old}^{(t)}(\eta,\nu))d\eta}dx \quad (31)$$

-continued $$c_{ML}^{(t)}(h\mid F,m)=\frac{1}{w_{ML}^{(t)}(F,m)}\int_{-\infty}^{\infty}p_\Psi^{(t)}(x)\frac{w_{old}^{(t)}(F,m)p(x,h\mid F,m,\mu_{old}^{(t)}(F,m))}{\int_{Fli}^{Fhi}\sum_{\nu=1}^{Mi}w_{old}^{(t)}(\eta,\nu)p(x\mid\eta,\nu,\mu_{old}^{(t)}(\eta,\nu))d\eta}dx \quad (32)$$

Through the repeated calculations, a probability density function $p_{FO}^{(t)}(F)$ of a fundamental frequency in which a preliminary distribution is taken account is obtained based on $w^{(t)}(F,m)$ according to the equation (23). Further, the ratio $c^{(t)}(h|F,m)$ of magnitudes of harmonic components of every tone model $p(x|F,m, \mu^{(t)}(F,m))$ is obtained. Consequently, the expansions 1 to 3 are realized.

In order to determine the most dominant fundamental frequency Fi(t), a frequency that maximizes a probability density function $p_{FO}^{(t)}(F)$ (obtained as a final estimate through repeated calculations of the equations (29) to (32) according to the equation (22)) is obtained as expressed by the equation below.

$$Fi(t)=\underset{F}{\operatorname{argmax}}\,p_{F0}^{(t)}(F) \quad (33)$$

The thus obtained frequency is regarded as a pitch.

<<Multi-agent Model-based Time-sequential Fundamental Frequency Tracking 42>>

In a probability density function of a fundamental frequency, when multiple peaks are related to fundamental frequencies of tones being generated simultaneously, the peaks may be sequentially selected as the maximum value of the probability density function. Therefore, a simply obtained result may not remain stable. In the present embodiment, in order to estimate a fundamental frequency from a broad viewpoint, trajectories of multiple peaks are time-sequentially tracked along with a temporal change in the probability density function of a fundamental frequency. From among the trajectories, a trajectory representing a fundamental frequency that is the most dominant and stable is selected. In order to dynamically and flexibly control the tracking processing, a multi-agent model is introduced.

Figure 3:
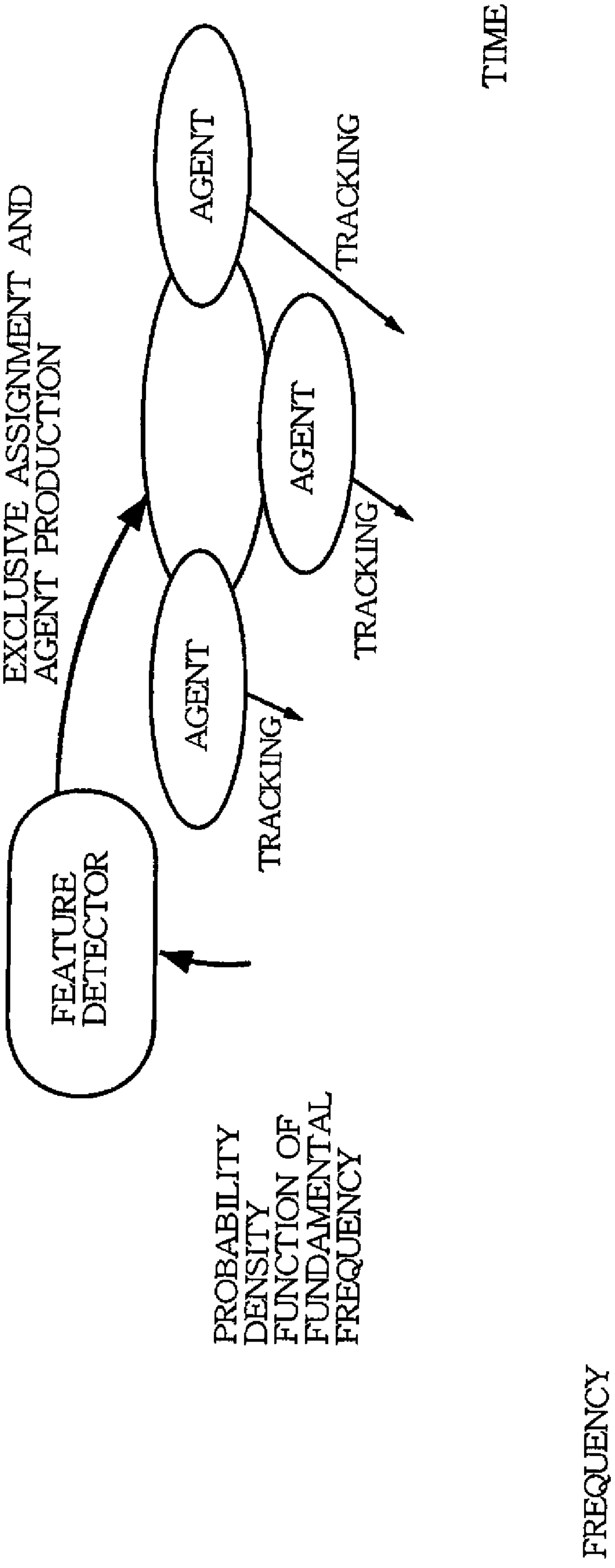
FIG. 3 shows the time-sequential tracking of fundamental frequencies by a multi-agent model performed in the fundamental frequency estimation processing.

A multi-agent model is composed of one feature detector and multiple agents (see FIG. 3). The feature detector picks up conspicuous peaks from a probability density function of a fundamental frequency. The agents basically are driven by the respective peaks and track their trajectories. Namely, the multi-agent model is a general-purpose scheme for temporally tracking conspicuous features of an input. Specifically, processing to be described below is performed at each time instant.

(1) After a probability density function of a fundamental frequency is obtained, the feature detector detects multiple conspicuous peaks (peaks exceeding a threshold that dynamically changes along with a maximum peak). The feature detector assesses each of the conspicuous peaks in consideration of a sum $Pow^{(t)}$ of powers of frequency components how promising the peak is. This is realized by regarding a current time instant as a time instant that comes several frames later, and foreseeing the trajectory of the peak to the time instant.

(2) If already produced agents are present, they interact to exclusively assign the conspicuous peaks to the agents that are tracking trajectories similar to the trajectories of the peaks. If multiple agents become candidates for an agent to which a peak is assigned, the peak is assigned to the most reliable agent.

(3) If the most promising and conspicuous peak is not assigned yet, a new agent that tracks the peak is produced.

(4) Each agent is imposed a cumulative penalty. If the penalty exceeds a certain threshold, the agent vanishes.

(5) An agent to which a conspicuous peak is not assigned is imposed a certain penalty, and attempts to directly find the next peak, which the agent will track, from the probability density function of a fundamental frequency. If the agent fails to find the peak, it is imposed another penalty. Otherwise, the penalty is reset.

(6) Each agent assesses its own reliability on the basis of a degree to which an assigned peak is promising and conspicuous, and a weighted sum with the reliability at the immediately preceding time instant.

(7) A fundamental frequency Fi(t) at a time instant t is determined based on an agent whose reliability is high and which is tracking the trajectory of a peak along which powers that amount to a large value are detected. An amplitude Ai(t) is determined by extracting harmonic components relevant to the fundamental frequency Fi(t) from $\Psi_p^{(t)}(\omega)$.

The fundamental frequency estimation processing 115 in the present embodiment has been detailed so far.

<Actions in the Present Embodiment>

Next, actions in the present embodiment will be described. In the performance position control processing 112 in the present embodiment, a position in a composition which a user should play is monitored all the time. Performance data associated with the performance position is sampled from the composition data 105*a* in the composition memory unit 105, and outputted and thus passed to the composition reproduction processing 113 and composition display processing 114 alike. Moreover, in the performance position control processing 112, a target fundamental frequency of a performance sound of a user's performance part is obtained based on the performance data associated with the performance position, and passed to the fundamental frequency estimation processing 115.

In the composition reproduction processing 113, an acoustic signal representing a performance sound of a part other than the user's performance part (that is, a background sound) is produced, and the sound system 107 is instructed to reproduce the sound. Moreover, in the composition display processing 114, based on the performance data passed from the performance position control processing 112, an image expressing a performance sound which the user should play (for example, an image expressing a key of a keyboard to be depressed) or an image expressing a performance position which the user should play (an image expressing a performance position in a musical note) is displayed on the display unit 108.

When a user plays a musical instrument, if the performance sound is collected by the sound collection unit 104, an input acoustic signal representing the performance sound is passed to the fundamental frequency estimation processing 115. In the fundamental frequency estimation processing 115, tone models 115M each simulating a harmonic structure of a sound generated by a musical instrument are employed, and weight values for the respective tone models 115M are optimized so that the frequency components of the input acoustic signal will manifest a mixed distribution obtained by weighting and adding up the tone models 115M associated with various fundamental frequencies. Based on the optimized weight values for the respective tone models, the fundamental frequency or frequencies of one or multiple performance sounds represented by the input acoustic signal are estimated. At this time, in the fundamental frequency estimation processing 115 in the present embodiment, a preliminary distribution $po_t(\theta^{(t)})$ is produced so that a weight relating to the target fundamental frequency passed from the performance position control processing 112 is emphasized therein. While the preliminary distribution $po_t(\theta^{(t)})$ is used and the ratio of magnitudes of harmonic components in each tone model is varied, an EM algorithm is executed in order to estimate the fundamental frequency of the performance sound.

In the similarity assessment processing 116, the similarity between the fundamental frequency estimated through the fundamental frequency estimation processing 115 and the target fundamental frequency obtained through the performance position control processing 112 is calculated. As for what is used as the similarity, various modes are conceivable. For example, a ratio of a fundamental frequency estimated through the fundamental frequency estimation processing 115 to a target fundamental frequency (that is, a value in cent expressing a deviation between the logarithmically expressed frequencies) may be divided by a predetermined value (for example, a value in cent expressing one scale), and the quotient may be adopted as the similarity. In the correspondence determination processing 117, based on the similarity obtained through the similarity assessment processing 116, a decision is made on whether the fundamental frequency estimated through the fundamental frequency estimation processing 115 and the target fundamental frequency obtained through the performance position control processing 112 correspond with each other. In the result-of-decision display processing 118, the result of a decision made through the correspondence decision processing 117, that is, whether a user has generated a performance sound at a pitch specified in performance data is displayed on the display unit 108. In a preferred mode, a musical note is displayed on the display unit 108, and a user is appropriately informed of his/her error in a performance through the result-of-decision display processing 118. In the musical note, a note of a performance sound designated with the performance data associated with a performance position (that is, a note signifying a target fundamental frequency) and a note signifying a fundamental frequency of a performance sound actually generated by a user are displayed in different colors.

In the present embodiment, the foregoing processing is repeated while the performance position is advanced.

As described so far, according to the present embodiment, tone models each simulating a harmonic structure of a sound generated by a musical instrument are employed. Weight values for the respective tone models are optimized so that the frequency components of a performance tone collected by the sound collection unit 104 will manifest a mixed distribution obtained by weighting and adding up the tone models associated with various fundamental frequencies. The fundamental frequency of the performance sound is estimated based on the optimized weight values for the respective tone models. Consequently, the fundamental frequency of a performance sound can be high precisely estimated, and a decision can be accurately made on the fundamental frequency of the performance sound. In the present embodiment, since the fundamental frequency of a performance sound generated by a user is obtained, an error in a performance can be presented to a user in such a manner that a sound which should have a certain pitch has been played at another pitch. Moreover, in the present embodiment, while the ratio of magnitudes of harmonic components of a tone model is varied, an EM algorithm is executed in order to estimate the fundamental frequency of a performance sound. Consequently, even in a situation in which the spectral shape of a performance sound generated by a user largely varies depending on the dynamics of a performance or the touch thereof, the ratio of magnitudes of harmonic components of a tone model can be changed along with a change in the spectral shape. Consequently, the fundamental frequency of a performance sound can be highly precisely estimated.

Other Embodiments

One embodiment of the present invention has been described so far. The present invention has other embodiments. Examples will be described below.

(1) In the aforesaid embodiment, in the fundamental frequency estimation processing 115, one fundamental frequency or multiple fundamental frequencies are outputted as a result of estimation. Alternatively, the probability density function of a fundamental frequency of a performance sound may be outputted as the result of estimation. In this case, in the similarity assessment processing 116, a probability density function such as a Gaussian distribution having a peak in relation to a target fundamental frequency may be produced. The similarity between the probability density function of the target fundamental frequency and the probability density function of a fundamental frequency obtained through the fundamental frequency estimation processing 115 is calculated. When a chord is played at a performance position, multiple target fundamental frequencies are generated. In this case, probability density functions having peaks in relation to the respective target fundamental frequencies are synthesized in order to obtain the probability density function of a target fundamental frequency. As for a method of calculating the similarity between the probability density function for a performance sound and the probability density function of a target fundamental frequency, for example, various modes described below are conceivable.

Figure 4:
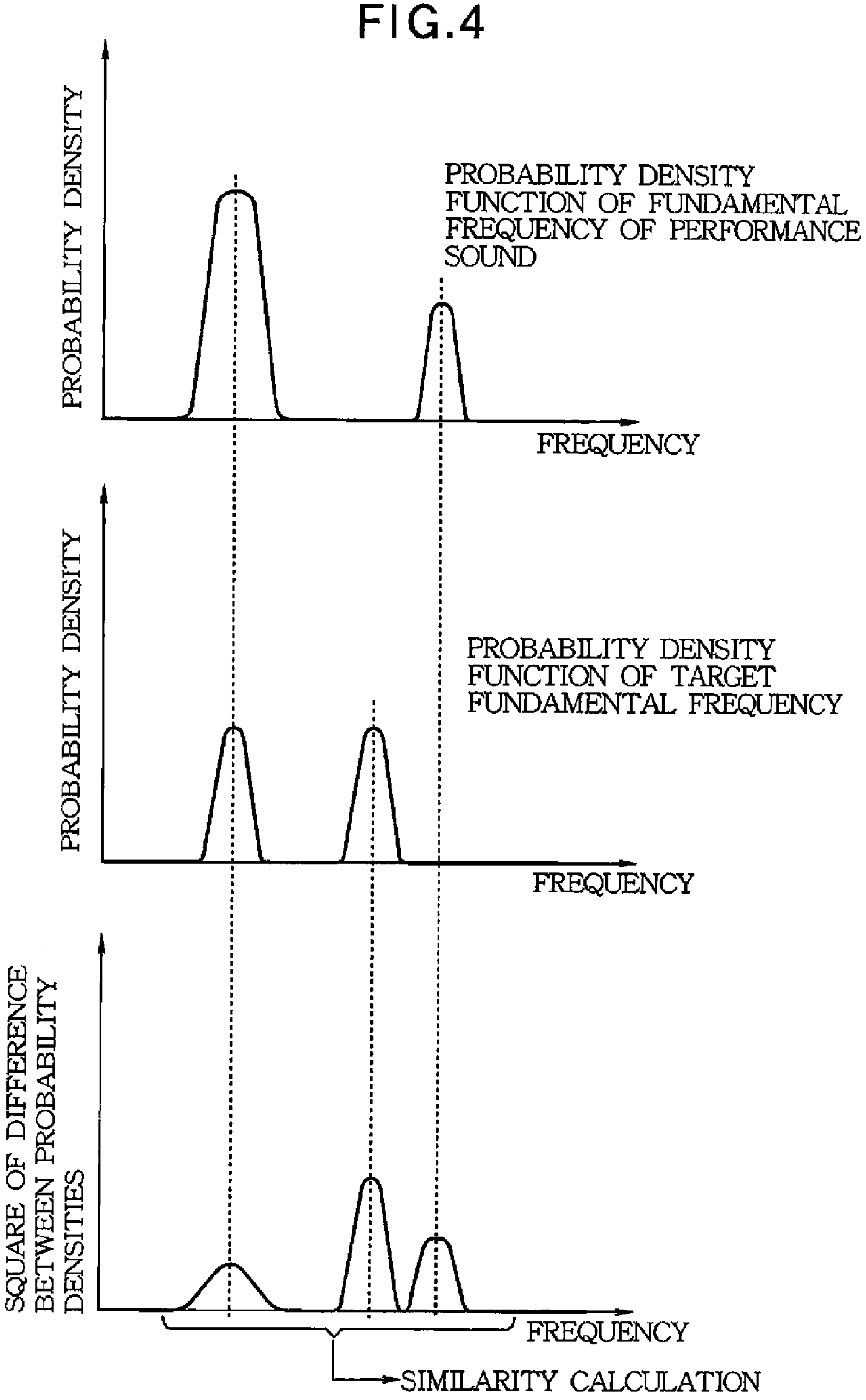
FIG. 4 shows a variant of a method of calculating a similarity of a fundamental frequency in the embodiment.

(1-1) A mean square error RMS between two probability density functions, that is, as shown in FIG. 4, the square of a difference between a probability density in the probability density function of a fundamental frequency of a performance sound and a probability density in the probability density function of a target fundamental frequency is integrated over an entire frequency band, and divided by a predetermined constant C. An inverse number of the square root of the quotient is adopted as the similarity. Instead of the inverse number of the square root, a value obtained by subtracting the square root from a predetermined maximum number may be adopted as the similarity.

Figure 5:
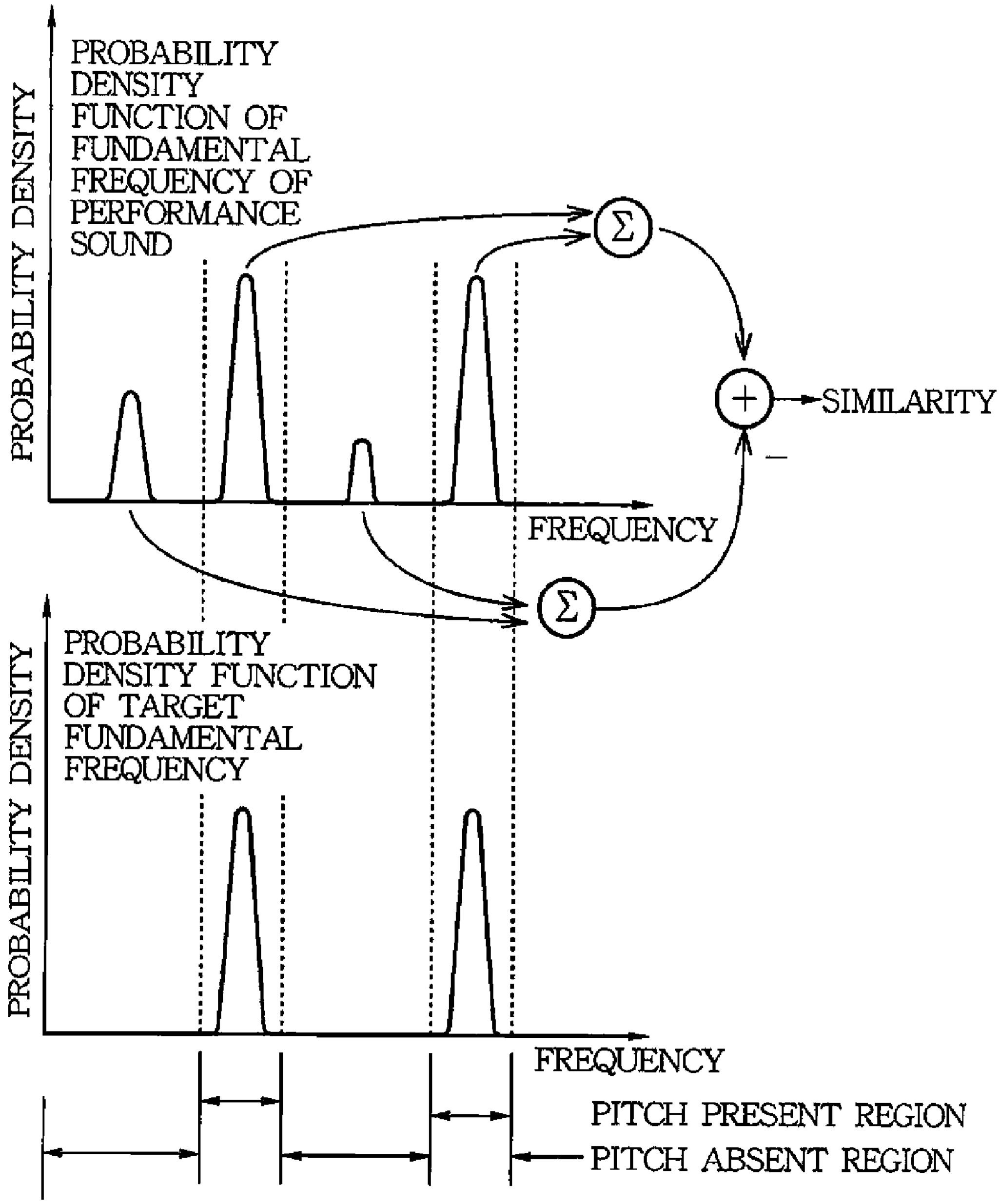
FIG. 5 shows another variant of the method of calculating a similarity of a fundamental frequency in the embodiment.

(1-2) As shown in FIG. 5, a frequency band is divided into a pitch present region in which a probability density of a target fundamental frequency is high and a pitch absent region in which the probability density of the target fundamental frequency is nearly 0. A sum of probability densities relating to frequencies, which belong to the pitch present region, in the probability density function of a fundamental frequency of a performance sound obtained through the fundamental frequency estimation processing 115, and a sum total of probability densities relating to frequencies, which belong to the pitch absent region, therein are calculated. A difference obtained by subtracting the latter from the former may be adopted as a similarity.

Figure 6:
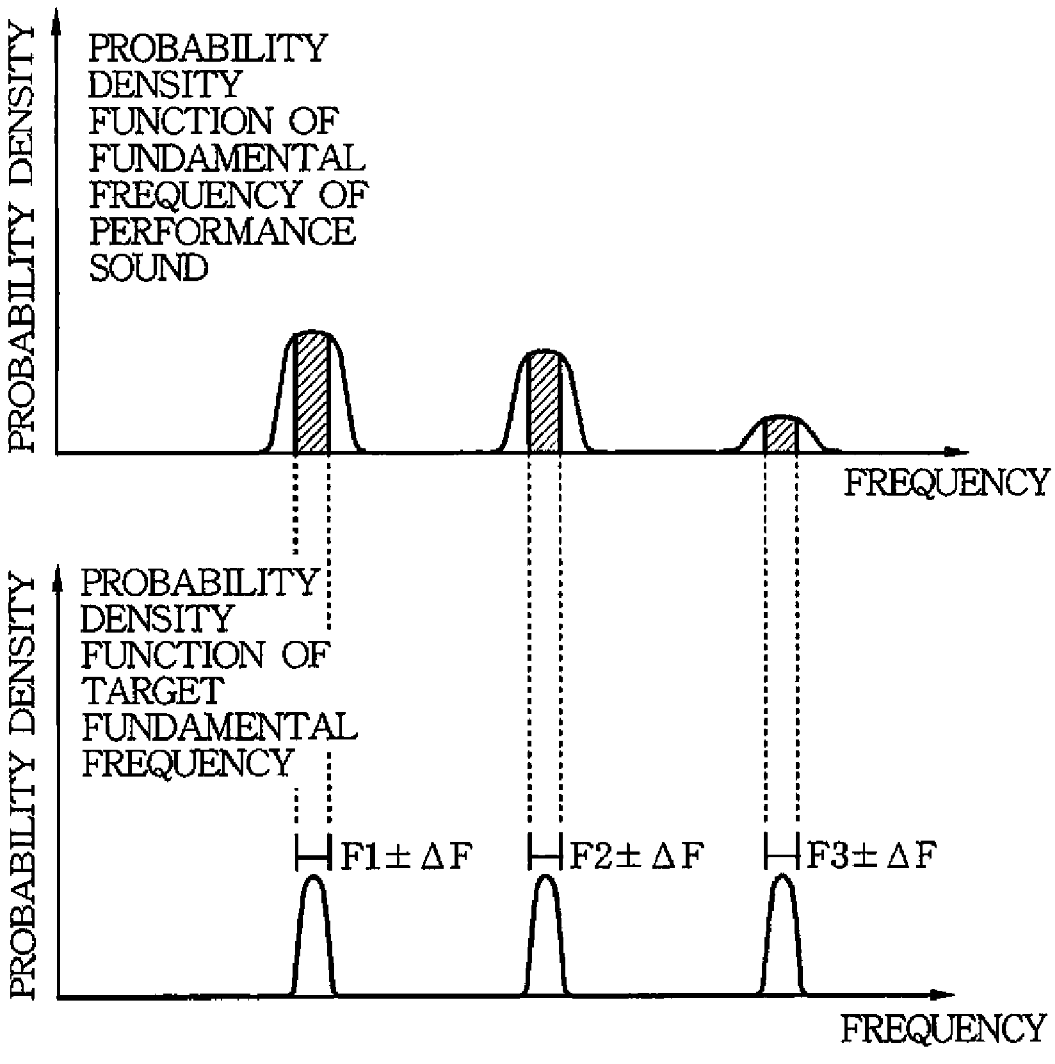
FIG. 6 shows still another variant of the method of calculating a similarity of a fundamental frequency in the embodiment.

(1-3) As shown in FIG. 6, a derivation of integration of values of a probability density function of a fundamental frequency of a performance sound over a frequency range of a predetermined width with a target fundamental frequency as a center is calculated. In an illustrated example, there are three sounds, which should be played, at a performance position. F1, F2, and F3 denote the fundamental frequencies of the sounds. A derivative of integration of values of the probability density function of the performance sound over each of the ranges of F1±ΔF, F2±ΔF, and F3±ΔF (hatched areas in the drawing) is calculated. A derivative of integration of values over a range with a target fundament frequency for each of the sounds as a center is calculated as a similarity. Depending on whether the similarity exceeds a threshold, a decision is made on whether the sound of each target fundamental frequency has been correctly played. In this case, when the number of sounds to be played at a performance position is large, each of the probability density functions of the performance sounds has numerous peaks at which the similarity to a probability density function of a target fundamental frequency is low. Even if a correct performance is actually given, an incorrect decision may be made that a correct performance has not been conducted. In order to prevent the incorrect decision, when the number of sounds to be played at a performance position is k, a product of a derivative of integration over a range with the target fundamental frequency as a center by k may be adopted as a similarity.

(1-4) A certain feature value may be sampled from each of the probability density function of a fundamental frequency of a performance sound and the probability density function of a target fundamental frequency. A product of the feature values, powers thereof, mathematical functions thereof, or any other value may be adopted as a similarity in order to readily discriminate the probability density function of a fundamental frequency of a performance sound from the probability density function of a target fundamental frequency.

(1-5) For example, two of the aforesaid methods may be adopted in order to obtain two kinds of similarities (first and second similarities). A third similarity obtained by linearly coupling the first and second similarities may be adopted as a similarity based on which a decision is made on whether a performance sound has a correct pitch. In this case, under various conditions including a condition that a performance sound is generated according to a target fundamental frequency or a condition that a performance sound whose fundamental frequency is deviated from the target fundamental frequency is generated, a performance sound is generated and the fundamental frequency thereof is estimated. Under each of the conditions, while weights for the first similarity and second similarity are varied, the third similarity between the probability density function of a fundamental frequency and the probability density function of the target fundamental frequency is calculated. A known decision/analysis technique is used to balance the weights for the first similarity and second similarity so as to obtain the third similarity that simplifies discrimination for deciding whether the fundamental frequency of a performance sound and the target fundamental frequency correspond with each other. Aside from the known decision/analysis technique, a technique known as a neural network or a support vector machine (SVM) may be adopted.

(2) In the aforesaid embodiment, instead of executing the similarity assessment processing 116 and correspondence decision processing 117, a marked peak may be selected from values of the probability density function of a fundamental frequency obtained through the fundamental frequency estimation processing 115. Based on a degree of correspondence between a fundamental frequency relevant to the peak and a target fundamental frequency, a decision may be made whether a performance has been conducted at a correct pitch.

(3) Sample data of an acoustic signal obtained by recording an instrumental performance that can be regarded as an exemplar may be used as composition data. Fundamental frequency estimation processing may be performed on the composition data in order to obtain a target fundamental frequency of a performance sound which a user should generate. Specifically, in FIG. 1, aside from the fundamental frequency estimation processing 115 for estimating the fundamental frequency of a performance sound collected by the sound collection unit 104, fundamental frequency estimation processing for estimating the fundamental frequency of an exemplary performance sound using composition data (sample data of the exemplary performance sound) for a performance position sampled through the performance position control processing 112 is included. The fundamental frequency of the exemplary performance sound estimated through the fundamental frequency estimation processing is adopted as a target fundamental frequency. In this mode, the performance sound of the exemplary performance may be collected by the sound collection unit 104, and an acoustic signal sent from the sound collection unit 104 may be stored as composition data of the exemplary performance in the composition memory unit 105.

The invention claimed is:

1. A sound analysis apparatus comprising:

a performance sound acquisition part that externally acquires a performance sound of a musical instrument;

a target fundamental frequency acquisition part that acquires a target fundamental frequency to which a fundamental frequency of the performance sound acquired by the performance sound acquisition part should correspond;

a fundamental frequency estimation part that employs tone models which are associated with various fundamental frequencies and each of which simulates a harmonic structure of a performance sound generated by a musical instrument, then defines a weighted mixture of the tone models to simulate frequency components of the performance sound, then sequentially updates and optimizes weight values of the respective tone models so that a frequency distribution of the weighted mixture of the tone models corresponds to a distribution of the frequency components of the performance sound acquired by the performance sound acquisition part, and estimates the fundamental frequency of the performance sound acquired by the performance sound acquisition part based on the optimized weight values; and a decision part that makes a decision on a fundamental frequency of the performance sound, which is acquired by the performance sound acquisition part, on the basis of the target fundamental frequency acquired by the target fundamental frequency acquisition part and the estimated fundamental frequency of the performance sound.

2. The sound analysis apparatus according to claim 1, wherein the fundamental frequency estimation part applies a preliminary distribution of the weight values to the mixture of the tone models when the fundamental frequency estimation part optimizes the weight values of the respective tone models associated with the various fundamental frequencies, the preliminary distribution containing a weight value which relates to the target fundamental frequency acquired by the target fundamental frequency acquisition part and which is emphasized as compared to other weight values.

3. The sound analysis apparatus according to claim 1, wherein the fundamental frequency estimation part changes a ratio of magnitudes of harmonic components contained in the harmonic structure of each tone model during the course of sequentially updating and optimizing the weight value of each tone model.

4. A machine readable medium for use in a computer, the medium containing program instructions being executable by the computer to perform a sound analysis process comprising the steps of:

externally acquiring a performance sound of a musical instrument;

acquiring a target fundamental frequency to which a fundamental frequency of the performance sound should correspond;

employing tone models which are associated with various fundamental frequencies and each of which simulates a harmonic structure of a performance sound generated by a musical instrument;

defining a weighted mixture of the tone models to simulate frequency components of the performance sound;

sequentially updating and optimizing weight values of the respective tone models so that a frequency distribution of the weighted mixture of the tone models corresponds to a distribution of the frequency components of the performance sound;

estimating the fundamental frequency of the performance sound based on the optimized weight values; and evaluating the estimated fundamental frequency of the performance sound on the basis of the target fundamental frequency.

* * * * *